United States Patent [19]
Kim et al.

[11] Patent Number: 5,905,402
[45] Date of Patent: May 18, 1999

[54] VOLTAGE PUMP CIRCUIT HAVING AN INDEPENDENT WELL-BIAS VOLTAGE

[75] Inventors: Tae-Hoon Kim; Young-Hyun Jun, both of Seoul, Rep. of Korea

[73] Assignee: LG Semicon Co., Ltd, Chungcheongbuk-do, Rep. of Korea

[21] Appl. No.: 08/866,128

[22] Filed: May 30, 1997

[30]      Foreign Application Priority Data

Jun. 1, 1996 [KR] Rep. of Korea ...................... 96-19536

[51] Int. Cl.$^6$ ....................................... G05F 3/02
[52] U.S. Cl. .......................... 327/536; 327/390; 327/589; 327/333; 327/535; 327/537; 327/546; 326/81
[58] Field of Search ................................. 327/333, 537, 327/536, 538, 546, 589, 306, 534, 390, 530, 545, 541; 307/110; 326/68, 63, 80, 81

[56]              References Cited

U.S. PATENT DOCUMENTS 5,521,546   5/1996   Kim ......................................... 327/536

OTHER PUBLICATIONS

"Application of a High–Voltage Pumped Supply for Low–Power DRAM", by Foss et al., *1992 Symposium on VLSI Circuits Digest of Technical Papers*, pp. 106–107.
"Silicon Processing for the VLSI ERA", by Stanley Wolf, Lattice Press 1990, pp. 296–311.

*Primary Examiner*—Dinh Le
*Attorney, Agent, or Firm*—Birch, Stewart, Kolasch & Birch, LLP

[57]              ABSTRACT

A voltage pump circuit for precharging/pumping a charge to/from a pumping capacitor separately employs a voltage generator for independently supplying a well-bias voltage to a PMOS transfer transistor which transfers a charge of a precharged capacitor to produce reference voltage. The voltage of the voltage generator is applied to a well of the PMOS transfer transistor to body bias the PMOS transfer transistor and, thus, ruggedize its threshold voltage transistor. Here, the well-bias voltage equals or exceeds the reference voltage while being approximately twice a power source voltage. The well-bias voltage generator includes a non-overlap control circuit for receiving a pulse signal as an input to generate two pulse signals having different points of changing into high and low states, a second pumping capacitor, first, second and third bootstrap capacitors, a precharge circuit for precharging the voltage on the second pumping capacitor and first and second bootstrap capacitors for a predetermined period, a first step control circuit for controlling a first-step transistor, a second step control circuit for controlling a second-step transistor and a pumping control circuit for controlling a third-step transistor, which are provided for precharging the voltage to the third bootstrap capacitor, and a transfer transistor having a gate connected to the reference voltage of the third bootstrap capacitor for transferring the well-bias voltage.

5 Claims, 5 Drawing Sheets

VOLTAGE PUMP CIRCUIT HAVING AN INDEPENDENT WELL-BIAS VOLTAGE

BACKGROUND OF THE INVENTION

The present invention relates to a voltage pump circuit having an independent well-bias voltage, and more particularly to a pump circuit, wherein, in a pump circuit using a PMOS transistor as a transfer transistor, well-bias is applied to the transfer transistor with an independent voltage to allow for a stable pumping operation.

A conventional voltage pump circuit was disclosed in a thesis entitled: "Application of a High Voltage Pumped Supply for Low-power DRAM", R. C. Foss et al., 1992 *Symposium on VLSI Circuits Digest of Technical Papers*, pages 106–107, 1992.

One example of the conventional voltage pump circuit is illustrated in FIG. 1, which includes a level shifter 10 for controlling a gate of a transfer transistor MP4 with voltages of a ground voltage Vss and a boosted voltage Vpp, and a non-overlap circuit 20 for blocking an overlapping of a pumping time and a charge transfer time. In addition, a voltage pumping section 30, for pumping the voltage while precharging/pumping a charge to/from a pumping capacitor, is provided.

Level shifter 10 is formed such that a gate of PMOS transistor MP1 is supplied indirectly with boosted voltage Vpp via a drain of PMOS transistor MP2. The boosted voltage Vpp is directly connected to a source of a PMOS transistor MP2. A gate of PMOS transistor MP2 is indirectly supplied with boosted voltage Vpp via the drain of the transistor MP1. The source of the PMOS transistor MP1 is directly connected to Vpp. The drain of PMOS transistor MP1 is also indirectly connected to ground potential Vss via two NMOS transistors MN1 and MN2, and a drain of PMOS transistor MP2 is also indirectly connected to ground potential Vss via two NMOS transistors MN3 and MN4. Gates of NMOS transistors MN2 and MN3 are supplied with an internal power source Vint. A gate of NMOS transistor MN1 is connected to an input pulse OSC via an inverter INV1. Input pulse OSC is directly connected to a gate of NMOS transistor MN4.

By this construction, when input pulse OSC is high, the boosted voltage level Vpp is obtained at the drain of PMOS transistor MP1, and the ground potential Vss is obtained at the drain of PMOS transistor MP2. If input pulse OSC is low, the ground potential Vss is obtained at the drain of PMOS transistor MP1, and the boosted voltage level Vpp is obtained at the drain of PMOS transistor MP2.

Non-overlap circuit 20 includes a NAND gate, a NOR gate and an inverter INV2 such that either one of two inputs of the NAND gate is connected with pulse input OSC, and the other input is connected with the drain of PMOS transistor MP1 of level shifter 10. Then, either one of two inputs of the NOR gate is connected with pulse input OSC, and the other input is connected to the drain of PMOS transistor MP2 of level shifter 10 via inverter INV2.

Voltage pumping section 30 includes a pumping capacitor C1, and a PMOS transistor MP3 having a drain connected to a first electrode of pumping capacitor C1 at node A, a source connected to power source Vdd and a gate connected to an output of the NAND gate of non-overlap circuit 20 at a node C. Also, a PMOS transistor MP4, having a drain connected to a second electrode of pumping capacitor C1 at a node B, a source connected to boosted voltage Vpp and a gate connected to a drain of PMOS transistor MP2 of level shifter 10, is provided. An NMOS transistor MN7 has a drain connected to the second electrode of pumping capacitor C1 at the node B, a source connected to power source Vdd, a gate connected to the output of the NAND gate of non-overlap circuit 20 at the node C. In addition to these, an NMOS transistor MN5 has a drain connected to the first electrode of pumping capacitor C1 at the node A, a gate connected to internal power source Vint, and a source connected to a drain of an NMOS transistor MN6. The NMOS transistor MN6 also has a source connected to ground potential Vss and a gate connected to an output of the NOR gate of non-overlap circuit 20 at a node D.

As shown in timing charts of FIG. 2, an operation the conventional pump circuit is classified into two steps of precharging the pumping capacitor C1 and pumping (or discharging) the precharged pumping capacitor.

First, in the precharge step, when the OSC signal is in the "low" state, both a node C being the output terminal of the NAND gate and a node D being the output terminal of the NOR gate go to the "high" state. Thus, NMOS transistors MN5, MN6 and MN7 are turned on to allow a node A to be the Vss level and a node B is charged to Vdd-$V_T$ which is low, i.e., less than $V_T$ of NMOS transistor MN7.

After the precharge is performed as described above, the pumping step is performed successively. When the OSC signal goes to the "high" state, and node C (being the output terminal of the NAND gate) and node D (being the output terminal of the NOR gate) go to the "low" state. Thus, NMOS transistors MN6 and MN7 are turned off, so that node A is in the floating state and instantaneously goes to the Vdd level together with the turning on of the PMOS transistor MP3. Consequently, the level of node B is raised by an amount Vdd to be 2 Vdd-$V_T$. The NMOS transistor MN4 is turned on to apply the Vss level to the gate of PMOS transistor MP4 which, in turn, is turned on to raise the voltage of node B to the Vpp node.

While the pumping capacitor repeats the precharge and pumping via the above-described operation, the operation of raising the charge from the low potential level to the high potential level is continuously carried out.

In almost all semiconductor memory devices, a redundancy decoder is provided for using an additional cell when a word line is shorted out to the ground voltage Vss, thereby repairing the semiconductor chip. However, when such a word line (which had been shorted out to the Vss) has been inspected during an initial test of such a repaired chip using the foregoing conventional pump circuit, the Vpp level is lower than Vdd-$V_T$. Consequently, a PN junction is forward-biased in the transfer transistor MP4, so that the transfer transistor MP4 cannot be operated as a transistor. The shorted-out state of the PN junction of the transfer transistor MP4 is continued, making it impossible to recover to normal operation.

Therefore, the shorted-out state of the PN junction of the transfer transistor MP4 causes electric power to be greatly dissipated and the Vpp level to not recover. Consequently, the semiconductor chip must be treated as being defective, thereby degrading production yield.

SUMMARY OF THE INVENTION

The present invention is devised to solve the foregoing problems. Accordingly, it is an object of the present invention to provide a voltage pump circuit, wherein a voltage generator is separately employed for independently supplying a well-bias voltage to a substrate of an MOS transistor, preferably a PMOS transistor, used as a transfer transistor for transferring a charge of a precharged capacitor to a boosted or reference voltage. The voltage of the voltage generator is applied to a well, i.e., the substrate or body, of the PMOS transistor to adjust the threshold voltage of the PMOS transistor to compensate for the shorting problems of the prior art.

Here, a generating voltage of the voltage generator equals or exceeds the boosted voltage, and is approximately twice a power source voltage.

The foregoing and other objectives of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

Figure 3:
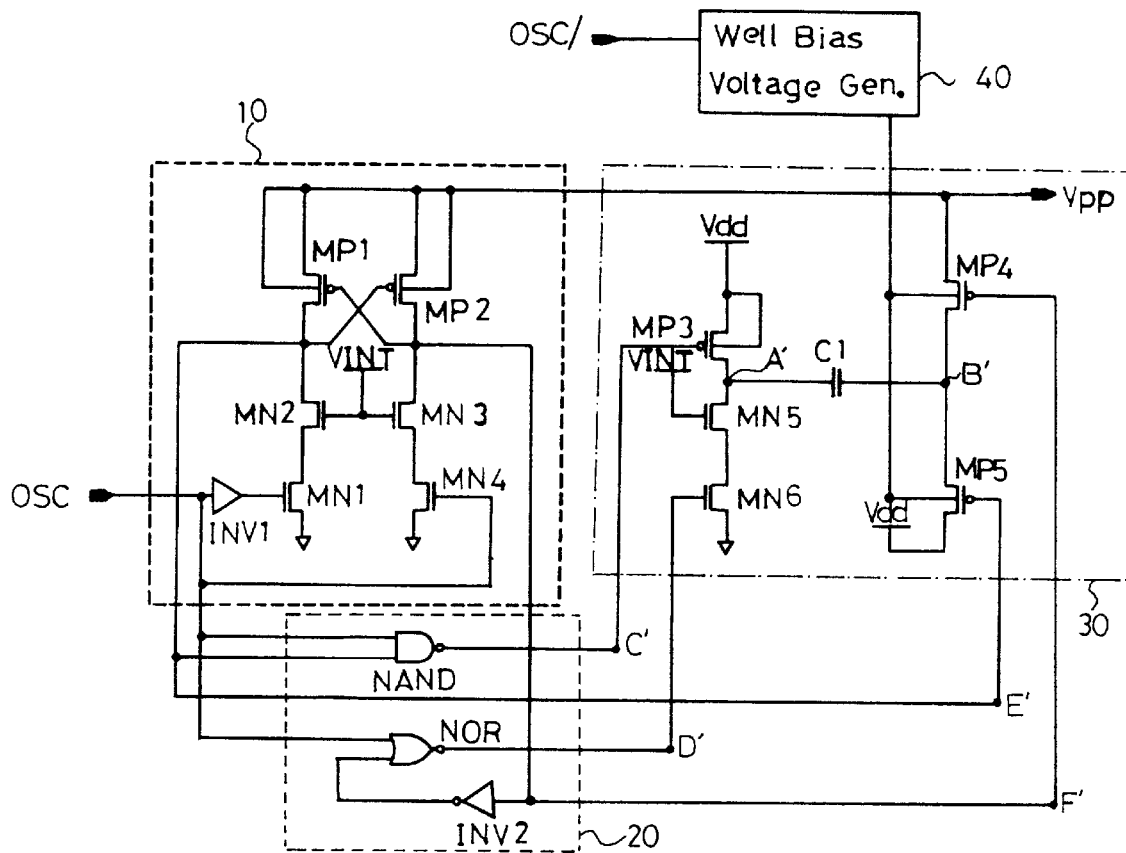
FIG. 3 is a diagram showing a voltage pump circuit having an independent well-bias voltage according to the present invention.

FIG. 3 is a circuit diagram showing one embodiment of a voltage pump circuit according to the present invention.

The voltage pump circuit according to the present invention includes: a level shifter 10 for controlling a gate of a transfer transistor MP4 with a ground voltage Vss and a boosted voltage Vpp; and a non-overlap circuit 20 for preventing an overlapping of a pumping time and a charge transfer time. A voltage pumping section 30 precharges and pumps a pumping capacitor C1 from Vdd to pump the voltage of 2Vdd, and a separate well-bias voltage generator 40 independently provides a well-bias voltage to PMOS transistor MP4 used as the transfer transistor and to PMOS transistor MP5 used as the precharge transistor.

Figure 1:
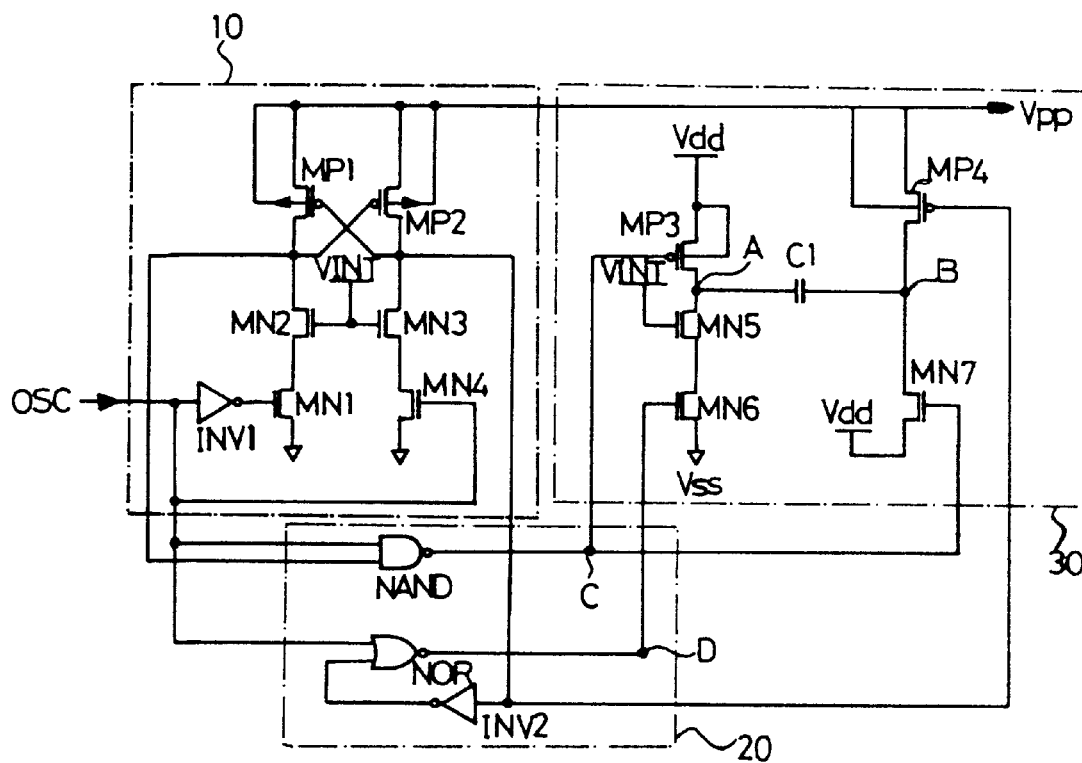
FIG. 1 is a diagram showing a conventional voltage pump circuit.
Figure 2:
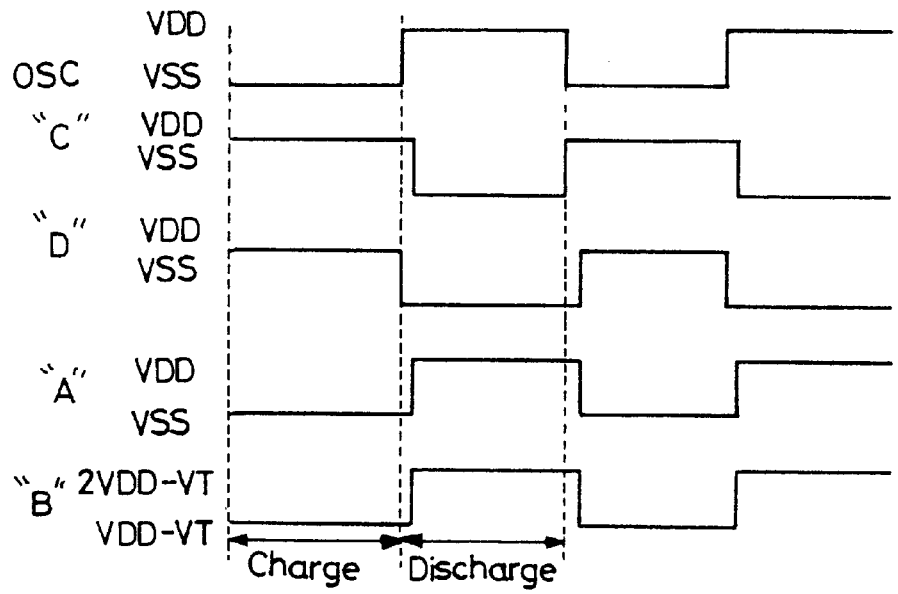
FIG. 2 is operational timing charts of the voltage pump circuit shown in FIG. 1.

Level shifter 10 and non-overlap circuit 20 of the pump circuit according to one embodiment of the present invention are constructed to be identical to those of the conventional circuit as shown in FIG. 1. Also, all other parts are the same except that the voltage pumping section 30 according to one embodiment of the present invention replaces NMOS transistor MN7, FIG. 1 of the conventional circuit, with PMOS transistor MP5. The gate of the PMOS transistor MP5 is connected to the drain of PMOS transistor MP1 of level shifter 10 at node E'; the source is connected to the second electrode of the pumping capacitor C1 at node B' and the source is connected to power source Vdd.

Figure 7:
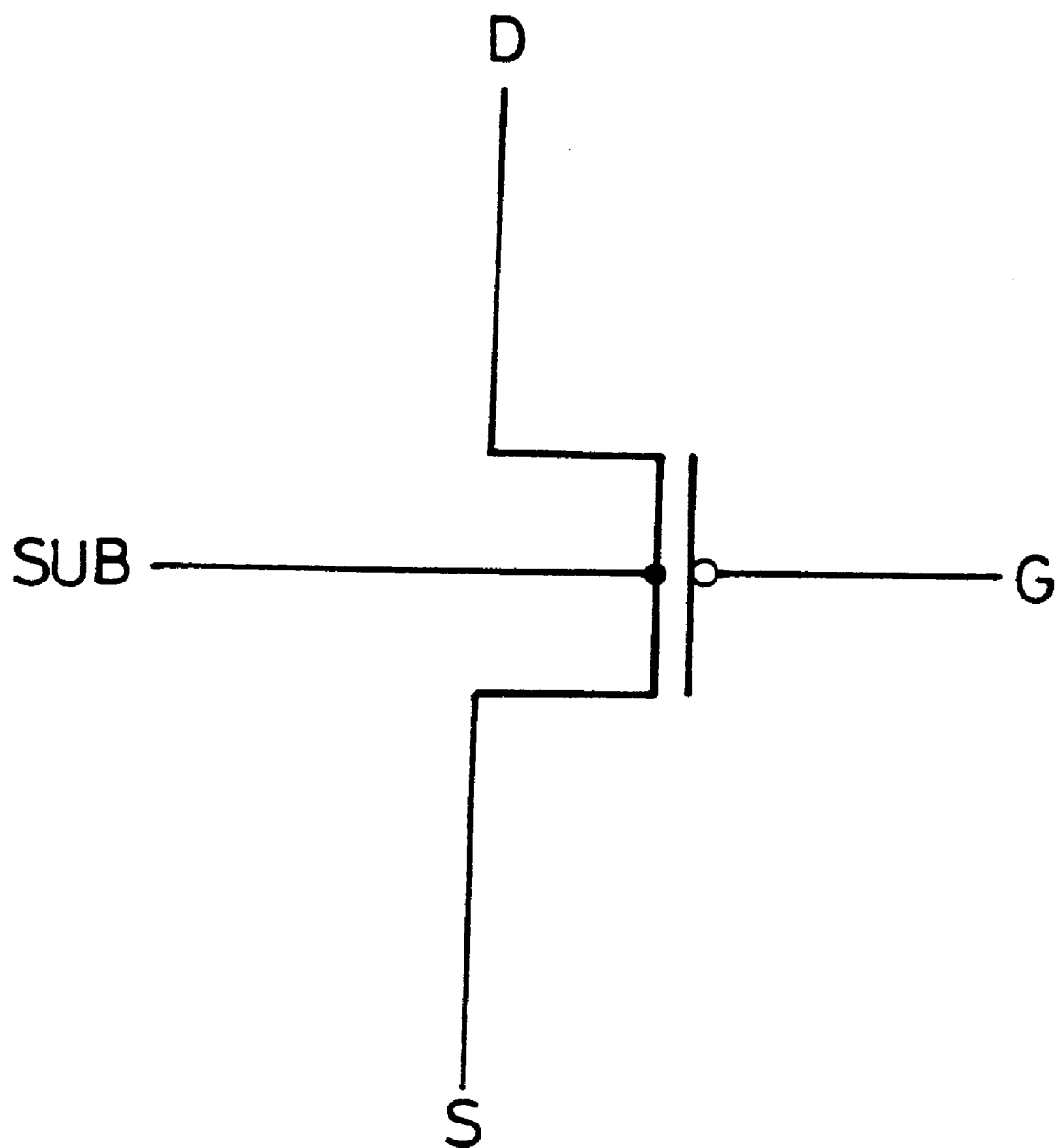
FIG. 7 depicts a basic PMOS transistor with the substrate connection being shown.

The transistors MP1, MP2, MP3, MP4 and MP5 are enhancement PMOS transistors. FIG. 7 depicts a basic enhancement PMOS transistor 100. Typically, the substrate, SUB, is internally connected to the source, S. If so connected, then it is conventional not to depict the connection of the PMOS transistor 100 to the substrate (also referred to as the body or well). The transistors MP1, MP2 and MP3 have their substrates connected to the sources, and this has been depicted. In contrast, the PMOS transistors MP4 and MP5 have their substrates connected to the well-bias generator 40, rather than to their respective source terminals.

An operation of the pump circuit according to the present invention is performed by being classified into two steps of precharging the pumping capacitor and pumping (or discharging) the precharged pumping capacitor.

First, in the precharge step, the precharging is attained when the OSC signal is in the low state. Here, when a node C' (being an output terminal of the NAND gate) and a node D' (being the output terminal of the NOR gate) go to the high state, node E' and a node F' (being the outputs of level shifter 10, respectively) go to the low state and the high state (Vpp), respectively, to allow transistors MN5, MN6 and MP5 to be turned on and transistor MP4 to be turned off. Also, a node A' has the Vss level and a node B' is precharged with the Vdd level. In this case, PMOS transistor MP5 is used as the precharge transistor to be able to precharge the capacitor C1 to the Vdd level without causing a voltage drop of $V_T$ from the Vdd level, i.e., Vdd-$V_T$.

After the precharge performed as above, the pumping step is carried out successively. When the OSC signal goes to the high state, node D' (being the output terminal of the NOR gate) primarily drops to the Vss level to turn off NMOS transistor MN6, thereby floating node A'. Then, after a short delay, node C' (being the output terminal of the NAND gate) goes to the low state, and node E' (being one of the outputs of level shifter 10) goes to the high state (Vpp) to turn on PMOS transistor MP3 and turn off PMOS transistor MP5, respectfully. Accordingly, after a short delay, node A' attains the Vdd level in the floating state, node B' rises to 2Vdd, and thus node F' (being one of the outputs of level shifter 10) goes to the low state to turn on PMOS transistor MP4, thereby raising the voltage of node Vpp to 2Vdd.

Figure 4:
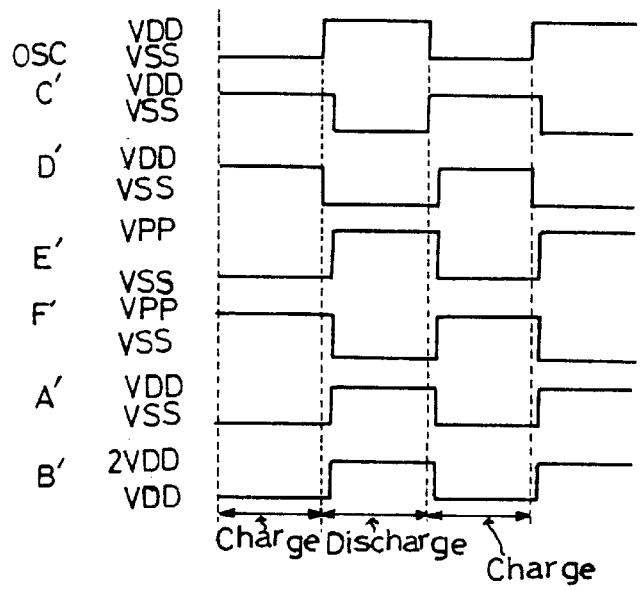
FIG. 4 is operational timing charts of the voltage pump circuit shown in FIG. 3.

As reflected in FIG. 4, the capacitor repeats the precharging and pumping to continue the voltage pumping operation.

Before operating the pump circuit, the output of well-bias voltage generator 40 maintains a 2Vdd voltage level.

Figure 5:
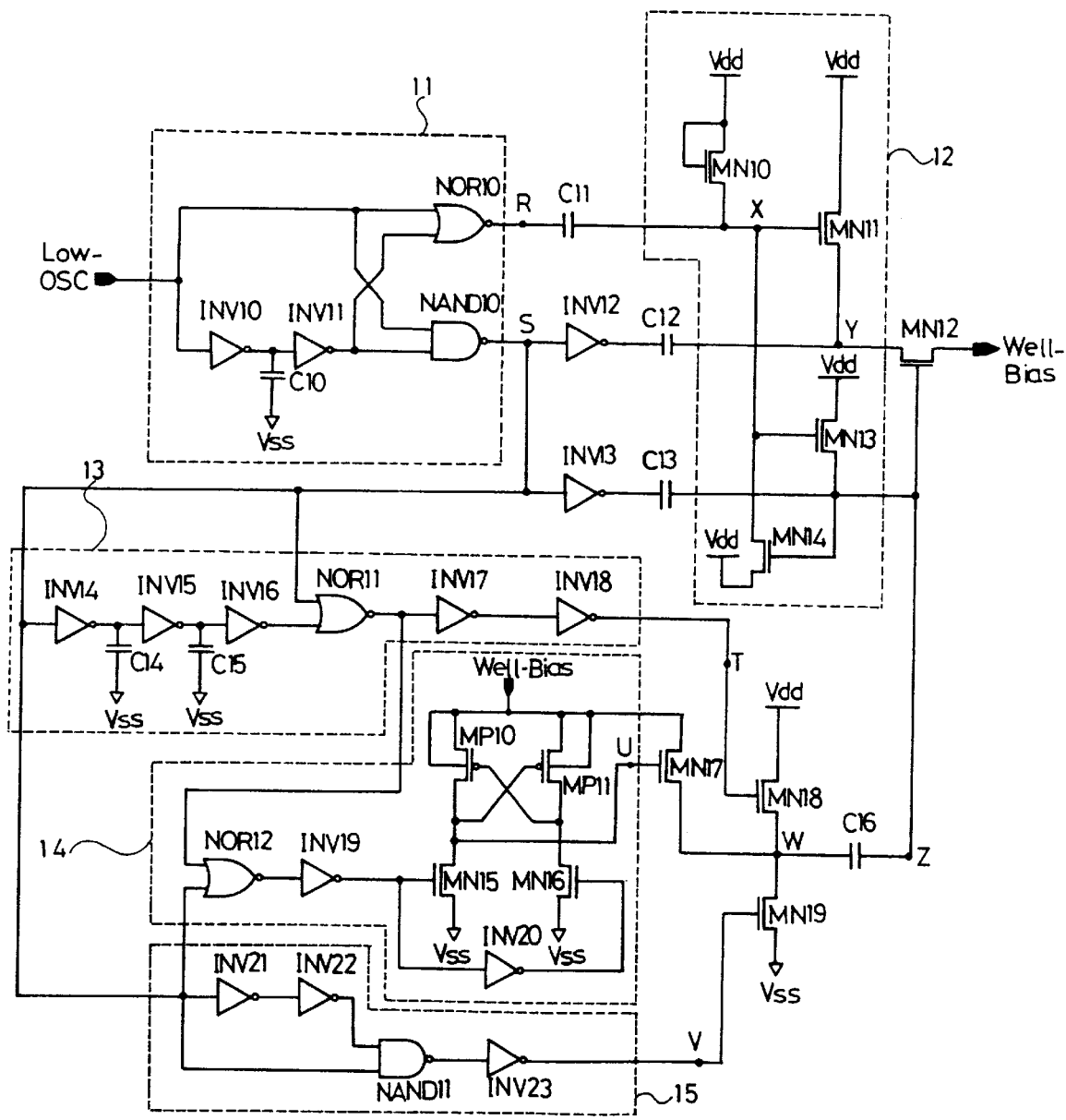
FIG. 5 is a circuit diagram showing the independent well-bias voltage generator according to the present invention.

Well-bias voltage generator 40 is illustrated in FIG. 5 as including a non-overlap control circuit 11, a pumping capacitor C12, bootstrap capacitors C11, C13 and C16, a precharge circuit 12, a first step control circuit 13 for controlling a transistor MN18, a second step control circuit 14 for controlling a transistor MN17, a pumping control circuit 15 for controlling a transistor MN19 and a transfer transistor MN12.

Figure 6:
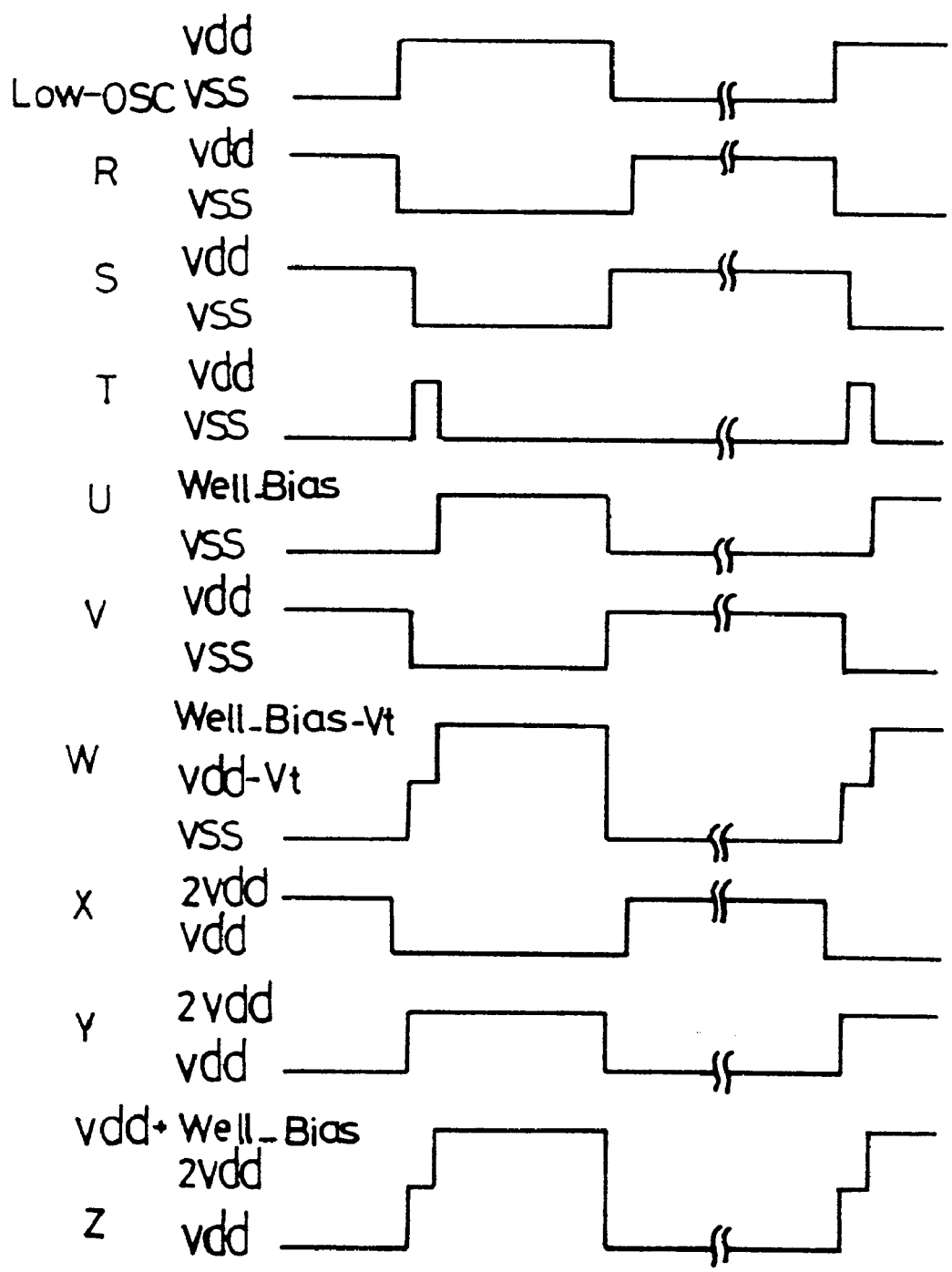
FIG. 6 is operational timing charts of the well-bias voltage generator shown in FIG. 5.

The embodiment of the well-bias voltage generator 40, depicted in FIG. 5, is operated as reflected in the waveforms of respective nodes as shown in FIG. 6.

The OSC pulse having a frequency with a short pumping interval and a long precharge interval is utilized to produce the pumping power capable of compensating for a leakage current of the well.

In this circuit, the precharge operation is performed during the low period of a pulse LOW_OSC. When pulse LOW_OSC goes low, nodes R and S go high (by non-overlap control circuit 11) and a node X is in the high state of 2Vdd (by bootstrap capacitor C11). Thus, precharge transistor MN11 is turned on to allow node Y to reach the Vdd level and to allow an output of an inverter INV12 to be low, thereby precharging capacitor C12 with approximately the Vdd level.

Thereafter, the pumping operation is performed during the high period of pulse LOW_OSC in such a manner that, when pulse LOW_OSC goes high, nodes R and S go to the low state while node X becomes the state of Vdd and transistor MN14 is turned on. Also, the output of inverter INV12 goes to the high state, Vdd. Accordingly, node Y is raised to approximately 2Vdd level by the voltage of pumping capacitor C12. At this time, precharge transistor MN11 is turned off and the 2Vdd level of node Y is provided to the well-bias terminal by the turning on of transfer transistor MN12. Here, transfer transistor MN12 is turned on because the level of node Z applied to the gate thereof exceeds the well-bias voltage on node Y.

Hereinbelow, a step of generating the voltage which exceeds the well-bias at node Z during the high period of pulse LOW_OSC will be described.

When pulse LOW_OSC is in the low state, node S goes to high. Whereas, if pulse LOW_OSC is in the high state, node S goes to the low state. The voltage of node S is supplied to bootstrap capacitor C13 via inverter INV13, a first step control circuit 13 for controlling transistor MN18, pumping control circuit 15 (for controlling transistor MN19), and second step control circuit 14 (for controlling transistor MN17). Thus, an output of NOR gate NOR11 of first step control circuit 13 is connected to the input of NOR gate NOR12 of second step control 14 together with the voltage of node S.

Transistor MN18 receives a pulse having a short high interval which is the pulse waveform of a node T (being the output of first step control circuit 13 that is to be turned on for a moment and then turned off). Transistor MN17 receives the pulse of a node U (being the output of second step control circuit 14 that is to be turned on while the high state continues). Transistor MN19 receives the output of pumping control circuit 15 that is turned on while a node V is in the high state.

A node W is supplied with a voltage of Vdd-$V_T$ level while transistor MN18 is turned on, the well-bias voltage Well_bias-$V_T$, while transistor MN17 is turned on, and the Vss voltage while transistor MN19 is turned on. The timing of turning on transistors MN18, MN17 and MN19 are shown in FIG. 6.

Node Z is precharged with the Vdd voltage level while node W goes to the Vss level. When the output of INV13 goes high, then the voltage of node Z is raised to 2Vdd and the voltage of node W is raised to Vdd-$V_T$. Then, when MN17 is turned on, the voltage of node W goes to Well_Bias-$V_T$. Consequently, the voltage of node Z is increased to approximately Vdd+Well_bias. While node Z is raised to exceed well-bias voltage Well_bias, transfer transistor MN12 is supplied with the Vdd+Well_bias voltage via the gate thereof, so that the transfer transistor MN12 is turned on. At this time, the 2Vdd voltage is transferred to the Well_Bias node.

In the pump circuit according to the present invention, the precharge transistor and transfer transistor are constituted by the PMOS transistors, and the well-bias voltage Well_bias applied to the well of the PMOS transistor is supplied with as much as 2Vdd by using the independent voltage generator. This prevents the turning on of the PN diode between a junction of the PMOS transistor and n-well. As a result, the pumping operation can be continued regardless of a short between the word line and Vss. Also, a defective cell can be repaired to return the chip to normal operation, thereby enhancing the production yield. In addition, the precharge voltage is not dropped by $V_T$ as compared with the case of using the NMOS transistor as the precharge transistor, which improves pumping efficiency.

In the voltage pump embodiments of the present invention, the independent voltage generator makes the transfer transistor more rugged or robust, i.e., it ruggedizes the transfer transistor. The independent voltage generator makes it possible to adjust the threshold voltage to compensate for the shorting problem of the prior art.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A voltage pump circuit comprising:
   a voltage pumping section having a first MOS transistor coupled between a boosted voltage and a first node, a second MOS transistor coupled between said first node and a first potential voltage, a third MOS transistor coupled between said first potential voltage and a second node, a fourth MOS transistor coupled between said second node and a second potential voltage, and a first pumping capacitor coupled between said first node and said second node, wherein said voltage pumping section generates a reference voltage at said second node by precharging and pumping a charge to and from said first pumping capacitor;
   a level shifter for receiving an oscillation signal, and for providing shifted signals for gates of said first MOS transistor and said second MOS transistor, respectively, in accordance with a logic level of said oscillation signal;
   a first non-overlap circuit for receiving said oscillation signal and said shifted signals for generating a charging control signal and a pumping control signal to gates of said third MOS transistor and fourth MOS transistor, respectively;
   a well-bias voltage generator having a second non-overlap circuit, a second pumping capacitor, a first and second bootstrap capacitor coupled between a precharge circuit and said second non-overlap circuit, a first step control circuit, a second control circuit, a pumping control circuit, and a MOS transfer transistor;
   wherein said second non-overlap control circuit receives said oscillation signal, and generates a first and second non-overlap control signal having transition points that occur at different times;
   wherein said precharge circuit precharges said second pumping capacitor and said first and second bootstrap capacitors for a predetermined period;
   wherein said first step control circuit receives said second non-overlap control signal and generates a first precharging control signal to charge a third bootstrap capacitor to a first voltage level;
   wherein said second step control circuit receives said second non-overlap control signal and generates a second precharging control signal to charge said third bootstrap capacitor to a second voltage level;

wherein said pumping control circuit receives said second non-overlap control signal and to generate a third precharging control signal to charge said third bootstrap capacitor to a third voltage level;

wherein said MOS transfer transistor has a gate connected to said third bootstrap capacitor, and transfers charge stored in said second pumping capacitor to a body of said first MOS transistor as a well-bias voltage.

2. The voltage pump circuit in claim 1, wherein said well-bias voltage equals or exceeds said reference voltage.

3. The voltage pump circuit in claim 1, wherein said well-bias voltage is approximately twice voltage applied to a source of said first MOS transistor.

4. The voltage pump circuit in claim 1, wherein said first MOS transistor is a PMOS transistor.

5. The voltage pump circuit in claim 1, said voltage pump circuit is used in a memory device.

* * * * *